United States Patent [19]

Brunn et al.

[11] Patent Number: 4,492,600
[45] Date of Patent: Jan. 8, 1985

[54] CORROSION-INHIBITING PAINTS AND LACQUERS

[75] Inventors: Horst Brunn; Franz Hund; Wolfgang Rambold; Peter Kresse; Gerd von Szadkowski, all of Krefeld, Fed. Rep. of Germany

[73] Assignee: Bayer Aktiengesellschaft, Leverkusen, Fed. Rep. of Germany

[21] Appl. No.: 398,226

[22] Filed: Jul. 14, 1982

[30] Foreign Application Priority Data

Jul. 21, 1981 [DE] Fed. Rep. of Germany ....... 3128716

[51] Int. Cl.³ .......................... C04B 9/02; C09D 5/08
[52] U.S. Cl. .............................. 106/14.34; 106/14.35; 106/292; 106/302; 106/304; 106/306; 106/308 Q
[58] Field of Search ............... 106/14.34, 14.39, 292, 106/302, 304, 306, 308 Q, 14.35; 260/448 B

[56] References Cited

U.S. PATENT DOCUMENTS 3,137,717  6/1964  Peters ........................... 260/448 B
3,200,136  8/1965  Grossmith ..................... 260/448 B
3,391,176  7/1968  Grossmith ..................... 260/448 B

*Primary Examiner*—Lorenzo B. Hayes
*Attorney, Agent, or Firm*—Connolly and Hutz

[57] ABSTRACT

This invention relates to corrosion-inhibiting paints and lacquers containing pigments comprising an organic corrosion inhibitor intercalated into an inorganic matrix said pigment having the formula wherein

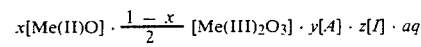

$$x[Me(II)O] \cdot \frac{1-x}{2} [Me(III)_2O_3] \cdot y[A] \cdot z[I] \cdot aq$$

wherein
  Me(II)O is at least one divalent metal oxide;
  Me(III)$_2$O$_3$ is at least one trivalent metal oxide;
  A is at least one inorganic acid anhydride;
  I is at least one organic corrosion inhibitor;
  aq is from 0.5 to 9 moles of water; and
  x, y and z are whole or fractional numbers and
  x has a value of from 0 to 1,
  y has a value of from 0 to 0.7 and
  z has a value of from greater than 0 to 0.4, with the proviso that the organic corrosion inhibitor is at least 0.5% by weight of inorganic material a process for the production of these pigments and their use in paints, lacquers and lubricants.

1 Claim, No Drawings

CORROSION-INHIBITING PAINTS AND LACQUERS

This invention relates to corrosion-inhibiting pigments based on intercalation compounds, to processes for the production thereof and to the use thereof.

Active anti-corrosion pigments of major practical significance are red lead, zinc potassium chromate, zinc dust and zinc phosphate.

Lead pigments are primarily used for long-term corrosion prevention, while chromates are more suitable for short-term corrosion prevention. In view of the high zinc metal contents required (up to 98%, by weight), zinc dust paints involve considerable processing problems. The zinc phosphate pigments hitherto recommended as corrosion-inhibiting pigments have corrosion-inhibiting properties significantly inferior to those of previously used zinc potassium chromate pigments.

The use of organic corrosion inhibitors of the type preferably used hitherto in aqueous systems, for example in water circuits, has often been complicated by the solubility levels in the lacquer, above all in the cases where the inhibitors have been used in the form of salts.

Accordingly, there is a considerable interest in new corrosion-inhibiting pigments which do not have the disadvantages of known corrosion-inhibiting pigments, or in new corrosion-inhibiting pigments which are active over a broader spectrum in combination with known corrosion-inhibiting pigments.

An object of the present invention is to develop new active corrosion-inhibiting pigments which, so far as the corrosion-inhibiting effect thereof is concerned, are at least equivalent to known corrosion-inhibiting pigments and which do not have the disadvantages of known corrosion-inhibiting pigments.

Materials which satisfy these requirements particularly effectively are composition pigments consisting of an inorganic matrix and, intercalated therein organic substances corresponding to the following formula:

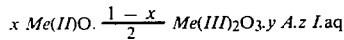

wherein
Me(II) represents one or more divalent metals;
Me(III) represents one or more trivalent metals;
A represents one or more anhydrides of inorganic acids;
I represents one or more organic compounds;
aq represents from 0.5 to 9 moles, preferably from 0.75 to 4 moles, of water; and
x, y and z are whole or fractional numbers, of which
x has values of from 0 to 1,
y has values of from 0 to 0.7 and
z has values of from greater than 0 to 0.4;
with the proviso that at least 0.5%, by weight, preferably more than 1.0%, by weight, of organic substance, based on the inorganic component, is present.

In one particular effective form, they have a specific surface according to BET which means the surface area of the corrosion-inhibiting pigments of this invention was determined by the Brunauer-Emmett-Teller equation of determining surface areas by the surface adsorption of Nitrogen (J. Americ. Chem. Soc. 60, 309 (1938)), of from 0.1 to 200 m$^2$/g, preferably from 1 to 150 m$^2$/g and a content of water soluble components of less than 0.6 %, preferably less than 0.3 %.

In the formula:

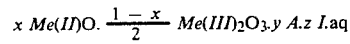

the divalent metals may be one or more of the metals selected from magnesium, calcium, strontium, barium, zinc, iron and manganese, while the trivalent metals may be one or more metals selected from aluminum iron, manganese and chromium.

The combination of trivalent aluminum with the similarly colourless alkaline-earth metals and/or the zinc cation is particularly preferred because, providing the organic substances and also the inorganic anions are suitably selected, it is possible to obtain pigments having no tinting strength which may be coloured as required.

The group of anhydrides of inorganic acids is formed from the oxides of boron, chromium, carbon, molybdenum, phosphorus and tungsten, carbon dioxide and phosphorus pentoxide being preferred. They may be used either individually or in combination.

The organic substances in the above formula are one or more known organic corrosion inhibitors having the character of Lewis bases.

A full review of this class of substances may be found in Articles in Chemikerzeitung No. 6 (1976), pages 247 to 262, DEFAZET No. 4 (1971), pages 155 to 162, loc cit No. 5, pages 213 to 223, loc cit No. 6, pages 257 to 266, loc cit No. 7, pages 310 to 319, loc cit No. 8, pages 361 to 367, and in the book entitled "Corrosion Inhibitors" by M. W. Ranney (Noyes DATA Co. 1976). Accordingly, the class of effective and intercalatable corrosion inhibitors includes higher amines, aldehydes, alcohols or ketones, amidines, guanidines, heterocyclic compounds containing nitrogen and/or oxygen and/or sulphur as hetero-atoms (urotropin, pyrazoles, imidazoles, imidazolines, oxazoles, isoxazoles, thiazoles, isothiazoles, triazoles, triazines, pyridines and the corresponding benzene-fused systems, such as benzimidazoles, benzothiazoles, benzotriazoles, quinolines or isoquinolines, quinazolines and others), sulphur-nitrogen compounds organic acetylene derivatives, organic nitro compounds and lignin derivatives (sulphonates).

It is particularly preferred to use phosphonic acids and phosphonocarboxylic acids and derivatives and salts, thereof, nitrogen-containing phosphonic or phosphono-carboxylic acids and derivatives and salts thereof, organic and inorganic salts of carboxylic acids, such as acetates, benzoates, cinnamates, salicylates, derivatives and salts of dicarboxylic acids and polycarboxylic acids and polyacrylates, derivatives of tannic acids, such as tannin and gallic acid, and synthetic aromatic phenolic hydroxy carboxylic acids and polymers or polyesters of phenolic hydroxy carboxylic acids. However, it is, of course, also possible to use suitable mixtures of these compounds.

By intercalating these compounds, known collectively as strongly hydrophilic organic reagents, in the inorganic matrix, the solubility thereof in the binder may surprisingly be reduced to such a considerable extent that corrosion-inhibiting pigments having excellent processing properties are obtained. For example, the corrosion-inhibiting pigments obtained in this way do not have the tendency towards bubble formation of the binder on exposure to weathering which is typical of readily soluble pigments and of pigments having an excessive salt content.

The choice of the organic compounds to be ultimately intercalated is determined essentially by the economy thereof and also by the particular applications envisaged. It is as preferred to use derivatives and salts of carboxylic acids and phosphonic acids as salts of benzoic acid, cinnamic acid, polycarboxylic acids and phosphonopropionic acids as well as tannin.

It is pointed out that the corrosion-inhibiting pigments according to the present invention contain water of crystallisation in a quantity of which the exact analytical determination involves difficulties because some very loosely bound water molecules are present. Thus, dehydration phenomena may occur at temperatures as low as 60° C. This relatively "volatile" water component depends to a very large extent upon the formulation conditions (drying temperature and drying time) and upon the crystallinity and particle size of the final corrosion-inhibiting pigment.

Thermogravimetric analysis of the compounds shows that dehydration of the substances occurs over the relatively wide temperature range of from 60° to 240° C., while dehydroxylation takes place at temperatures above 160° C. in the case of substances rich in $Me^{2+}$ (in which case there may be smooth transitions between dehydration and dehydroxylation), and at temperatures above 280° C. in the case of substances having x-values of from 0.2 to 0.6. In the case of the pigments rich in $Me^{3+}$, a second dehydroxylation step takes place at temperatures above 400° C.

The present invention also relates to processes for producing corrosion-inhibiting pigments corresponding to the following general formula:

$$x\ Me(II)O \cdot \frac{1-x}{2}\ Me(III)_2O_3 \cdot y\ A \cdot z\ I \cdot aq$$

In one of these processes, it is possible to precipitate a divalent and/or trivalent metal salt solution in the required ratio with equivalent quantities or an excess of alkalis, optionally in conjunction with alkali metallates, normally, inversely or simultaneously at temperatures of up to 100° C., preferably at temperatures of from 50° to 100° C. The inorganic anions and the organic inhibitors may be initially introduced together either during or after precipitation or may even be added after separation of the mother liquor of the host lattice.

In a second process, basic salts of the divalent and/or trivalent metals with the acid form of the inorganic and, optionally, organic ions are treated in air at temperatures of up to 100° C., preferably at temperatures of from 50° to 100° C. and, optionally after alkalisation, are heated in an autoclave for up to 12 hours at temperatures of up to 220° C.

It is, of course, also possible to use combinations of the two production processes, in which case salts of the inorganic and organic ions may also be used. In this case, the alkali should be used in such quantities that the corrosion-inhibiting pigments according to the present invention have a pH of greater than 6, preferably from 7.0 to 8.5.

Starting compounds suitable for use in the production of the corrosion-inhibiting pigments according to the present invention include, in the case of the divalent metals, the hydroxides, hydroxy salts, carbonates, basic carbonates, nitrates, chlorides, formates, acetates, oxalates and other organic compounds thereof, as well as the active oxides thereof. The metals Zn, Mg, Mn and Fe may also be used in the form of the sulphates thereof, in addition to which Zn may be used in the form of an alkali metal zincate. The trivalent metals may be used in the form of oxide-hydroxides, hydroxides, hydroxy salts, carbonates, basic carbonates, nitrates, chlorides, sulphates, formates, acetates, oxalates and organic carboxylates. However, if Ca-, Sr- and/or Ba-salts are used in combination with the trivalent metals, sulphates should not be used because otherwise substantially insoluble alkaline earth metal sulphates are also formed. Suitable precipitants are substances having an alkaline reaction preferably sodium hydroxide, soda, ammonia, ammonium-carbonate or mixtures thereof. According to the present invention, a pH of greater than 6.0, preferably from 7 to 9, should be adjusted, the final pH being variable in dependence upon the metal ions used and the final corrosion-inhibiting pigment having a DIN pH of greater than 6, preferably from 7 to 8.5.

It is advantageous to carry out precipitation with an excess of alkalis. This leads to excellent crystalline corrosion-inhibiting pigments. In the case of the heavy elements of Group IIa (Ca, Sr and Ba), only a few percent should be used because otherwise the binders may be readily hydrolysed and ultimately destroyed through excessive basicity. Accordingly, the quantity in which these metals are used is selected in such a way that the pH of the corrosion-inhibiting pigment obtained is no higher than 12, preferably no higher than 10. With increasing basicity from calcium via strontium and barium, the content of these alkaline earth metals in the inorganic matrix has to be reduced.

The pH of the corrosion-inhibiting pigments is determined in accordance with DIN 53 200, the pH of a suspension of the pigment prepared in a specific manner being measured. The corrosion-inhibiting pigments according to the present invention have specific surfaces according to BET (G. Brunauer, P. H. Emmet and H. Teller, J. Amer. Chem. Soc. 60, 309 (1938)) of from 0.1 to 200 m²/g, preferably from 1.0 to 150 m²/g. The water-soluble components are quoted in accordance with DIN 53 197.

The corrosion-inhibiting test of the pigments according to the present invention was carried out by the salt spray test according to the SS SIN 50 021 (long term spraying with a 5% common salt solution at 35±2° C.). The coatings were applied to phosphated steel plates (phosphating process: Bonder 101 of Metallgesellschaft, Frankfurt) and to degreased, bright steel plates. The primer was applied by spraying. The following standard test formulation was used:

| | |
|---|---|
| Binder: | Alkydal F 67 (a long-oil, fatty-acid-modified alkyd resin) |
| Main pigment: | Bayertitan A |
| Pigmenting level: | PVK 32% |
| Mixing ratio: | Main pigment to active pigment 80:15%, by weight |
| Grinding: | Vibrating ball mill |
| Required particle fineness: | At least below 25 μm |
| Processing: | Spraying (conventional) |

Two coating supports:
a. normal steel plates of the type normally used in a lacquer industry, bright and very carefully degreased,
b. phosphated steel plates (process: Bonder 101 of Metallgesellschaft, Frankfurt).

The results of the corrosion-inhibition testing of the test pigments and comparison pigments are set out in Table 1. The pigments were evaluated in accordance with the following scheme: samples were regularly taken over the test period, the steel plates receiving marks ranging from 0 (no damage) to 12 (complete destruction of the coating). The sum of the individual marks awarded to each plate gives the degree of corrosion which is then greater, the poorer the corrosion-inhibiting power of the coating.

The corrosion-inhibiting effect of the corrosion-inhibiting pigments according to the present invention is distinctly supeerior to that of the other divalent and trivalent metal salts used. In addition, despite minimal slow-release properties, they do not show the bubble formation in lacquers which is typical of soluble pigments.

They are therefore eminently suitable for use in corrosion-inhibiting paints, lacquers and lubricants.

The present invention is illustrated by the following Examples.

EXAMPLE 1

986.3 g of basic zinc carbonate (33.0%, by weight, of ZnO) are stirred into 2 liters of water and heated to 70° C. 7.65 g of 99.8%, by weight, benzoic acid are then added to the suspension, followed by the introduction over a period of 30 minutes of 500 ml of $Na_2Al(OH)_5$-solution (1.0 mole of $Al_2O_3/l$) [pH 11.8]. The pH is then reduced to 9.5 by the addition of 28.82 g of 85%, by weight, phosphoric acid, followed by stirring for 1 hour at 70° C., filtration, washing and drying at 110° C.

System: $x\, ZnO \cdot \frac{1-x}{2} Al_2O_3 \cdot y_1 P_2O_5 \cdot y_2 CO_2 \cdot z$ benzoic acid.aq x: 0.8
$y_1$: 0.025
$y_2$: 0.15
z: 0.0125 (corresponds to approximately 1.4%, by weight)
aq: 0.86
Reactants:
 basic zinc carbonate
 sodium aluminate
 phosphoric acid
 benzoic acid
Pigment-specific data:

| BET-surface | 35.0 m²/g |
|---|---|
| Density | 3.05 g/cc |
| Water-soluble fractions | 0.22% |

| Analysis | %, by weight | |
|---|---|---|
| ZnO | 63.9 | (0.803) |
| $Al_2O_3$ | 10.0 | (0.1) |
| $P_2O_5$ | 3.5 | (0.0252) |
| C inorg. | 1.7 | (0.145) |
| C org. | 1.0 | (0.0122) |
| $H_2O$ | 15.2 | (0.86) |

EXAMPLE 2

739.7 g of basic zinc carbonate having a ZnO-content of 33.0%, by weight, and 156.0 g of alumina hydrate (65.36%, by weight, of $Al_2O_3$), corresponding to a mixing ratio of Zn to Al of 3:2, are thoroughly mixed and made into a paste with a little water. 86.47 g of 85%, by weight, phosphoric acid and 32.1 g of 40%, by weight, phosphonopropionic acid are then added. The resulting reaction mixture is tempered in an autoclave for 4 hours at 190° C. (pressure: 14 bars) and the moist end product is dried at 110° C.

System:

$x\, ZnO \cdot \frac{1-x}{2} Al_2O_3 \cdot y_1 P_2O_5 \cdot y_2 CO_2 \cdot z$ phosphonopropionic acid.aq x: 0.6
$y_1$: 0.075
$y_2$: 0.1
z: 0.01667 (corresponds to approximately 2.5%, by weight)
aq: 1.1
Pigment-specific data:

| BET-surface | 24.0 m²/g |
|---|---|
| Density | 2.09 g/cc |
| Water-soluble fractions | 0.41% |

| Analysis: | %, by weight | |
|---|---|---|
| ZnO | 47.5 | (0.597) |
| $Al_2O_3$ | 20.1 | (0.202) |
| $P_2O_5$ | 10.5 | (0.0756) |
| C inorg. | 1.1 | (0.0936) |
| C org. | 0.58 | (0.0164) |
| $H_2O$ | 19.4 | (1.1) |

EXAMPLE 3

1232.9 g of basic zinc carbonate (ZnO-content 33.0%) are stirred into 1200 ml of water and heated to 70° C. 172.93 g of 85%, by weight, phosphoric acid and 38.53 g of 40%, by weight, phosphonopropionic acid are then added over periods of 10 minutes. The reaction is over after stirring for 4 hours at 70° C. and the product may be filtered off, washed and dried at 110° C.

System: $x\, ZnO \cdot y_1 P_2O_5 \cdot y_2 CO_2 \cdot z$ phosphonopropionic acid.aq x: 1
$y_1$: 0.15
$y_2$: 0.19
z: 0.02 (corresponds to 2.4%, by weight)
aq: 0.87
Pigment-specific data:

| BET-surface | 34.0 m²/g |
|---|---|
| Density | 3.26 g/cc |
| Water-soluble fractions | 0.17% |

| Analysis | %, by weight | |
|---|---|---|
| ZnO | 62.1 | (1.0) |
| $P_2O_5$ | 16.1 | (0.149) |
| C inorg. | 1.7 | (0.186) |
| C org. | 0.54 | (0.0196) |
| $H_2O$ | 12.0 | (0.871) |

EXAMPLE 4

The procedure is as in Example 3, except that 29.2 g of polycarboxylic acid (Belgard EV, a Ciba-Geigy product) are added instead of the phosphonopropionic acid.

System: $x$ ZnO.$y_1$P$_2$O$_5$.$y_2$CO$_2$.$z$ polycarboxylic acid-.aq x: 1
$y_1$: 0.15
$y_2$: 0.19
z: 4.4%, by weight, based on inorganic matrix
aq: 0.87

Pigment-specific data:

| BET-surface | 45 m²/g |
|---|---|
| Density | 3.58 g/cc |
| Water-soluble fractions | 0.19% |

| Analysis | %, by weight | |
|---|---|---|
| ZnO | 60.4 | (1.002) |
| P$_2$O$_5$ | 15.5 | (0.147) |
| C inorg. | 1.8 | (0.186) |
| C org. | 2.44 | (4.69) |
| H$_2$O | 12.5 | (0.86) |

EXAMPLE 5

3.7 liters of water are added to 739.7 g of basic zinc carbonate containing 33.0%, by weight, of ZnO and the resulting suspension heated with stirring to 80° C. 76.86 g of 85%, by weight, phosphoric acid and 20.18 g of 50%, by weight, of polyacrylic acid (POC-HS 2020, a Degussa product) having an average molecular weight of 1500 are then added dropwise over a period of 30 minutes, followed by stirring for 2 hours at 80° C. The suspension which still shows a strongly acid reaction (pH 5.3) is then adjusted to pH 8.5 with 166.7 ml of a 2.0 molar Na$_{1.56}$Al(OH)$_{4.56}$— solution, followed by stirring for another hour at 80° C., filtration, washing and drying at 105° C.

System:

$x$ ZnO.$\frac{1-x}{2}$ Al$_2$O$_3$.$y_1$P$_2$O$_5$.$y_2$CO$_2$.$z$ polyacrylic acid-aq x: 0.9
$y_1$: 0.1
$y_2$: 0.2
z: 0.00667 (corresponds to approximately 2.4%, by weight)
aq: 1.25

Pigment specific data:

| BET-surface | 53.0 m²/g |
|---|---|
| Density | 2.39 g/cc |
| Water-soluble fractions | 0.31% |

| Analysis | %, by weight | |
|---|---|---|
| ZnO | 57.7 | (0.903) |
| Al$_2$O$_3$ | 4.0 | (0.050) |
| P$_2$O$_5$ | 10.9 | (0.098) |
| C inorg. | 2.0 | (0.212) |
| C org. | 1.1 | (0.0019) |
| H$_2$O | 17.6 | (1.24) |

EXAMPLE 6

Two solutions, one consisting of 763.4 ml with 1.31 moles of MgSO$_4$/1 and 0.0375 mole of (NH$_4$) Mo$_7$O$_{24}$/1 and the second of 794.9 ml of ZnSo$_4$-solution (1.95 moles of ZnSo$_4$/1) are simultaneously added to 2000 ml of a sodium aluminate/zincate solution (0.5 mole of Al$_2$O$_3$/1; 0.12 mole of ZnO/1) tempered to 90° C. A final pH of 8.5 is then adjusted with a 45%, by weight sodium hydroxide solution. The temperature of the reaction solution should not fall below 80° C. during the addition. After precipitating the product is stirred for another 2 hours at 90° C. It is then filtered off while hot, washed, the filter cake re-suspended and 62.0 g of zinc benzoate (99.3%, by weight) and 46.1 g of 85%, by weight, phosphoric acid added. Any excessive reduction in pH is corrected with a little (final pH: 8.5). The suspension is then stirred for 2 hours at room temperature, subsequently filtered, washed free from salts and the filter cake dried at 110° C.

System:

$$\text{System: } x_1 \text{ ZnO}.x_2 \text{ MgO}.\frac{1-(x_1+x_2)}{2} \text{Al}_2\text{O}_3.y_1 \text{P}_2\text{O}_5.y_2 \text{MoO}_3.z \text{ benzoic acid aq.}$$

$x_1$: 0.4
$x_2$: 0.2
$y_1$: 0.04
$y_2$: 0.04
z: 0.08 (corresponds to 8.25%, by weight)
aq: 1.5

Pigment-specific data:

| BET-surface | 41.0 m²/g |
|---|---|
| Density | 2.5 g/cc |
| water-soluble fractions | 0.32% |

| Analysis | %, by weight | |
|---|---|---|
| ZnO | 27.7 | (0.407) |
| MgO | 6.6 | (0.196) |
| Al$_2$O$_3$ | 17.4 | (0.204) |
| MoO$_3$ | 4.8 | (0.040) |
| P$_2$O$_5$ | 4.8 | (0.040) |
| C org. | 5.25 | (0.075) |
| H$_2$O | 31.2 | (1.51) |

TABLE 1

| Corrosion inhibition results according to SS DIN 50 021 | | |
|---|---|---|
| Example No. or Product name | Bonder 101 DC* | Steel plate DC* |
| 1 | 12.0 | 23.5 |
| 2 | 14.0 | 22.0 |
| 3 | 8.0 | 14.0 |
| 4 | 4.5 | 16.5 |
| 5 | 6.0 | 24.0 |
| 6 | 10.0 | 14.5 |

TABLE 1-continued

| | Corrosion inhibition results according to SS DIN 50 021 | |
|---|---|---|
| Example No. or Product name | Bonder 101 DC* | Steel plate DC* |
| Zinc chromate | 4.5 | 19.0 |
| Zinc phosphate | 17.5 | 27.5 |

*degree of corrosion = sum of 6 evaluations (duration of salt spray test: 744 hours).

What is claimed is:

1. Corrosion-inhibiting paints and lacquers pigmented with a corrosion-inhibiting pigment having a specific surface according to BET of from 0.1 to 200 m²/g, a content of water-soluble components of less than 0.6%, and comprising an organic corrosion inhibitor intercalated into an inorganic matrix having the formula:

$$x[Me(II)O] \cdot \frac{1-x}{2} [Me(III)_2O_3] \cdot y[A] \cdot z[I] \cdot aq$$

wherein
 Me(II)O is at least one divalent metal oxide;
 ME(III)$_2$O$_3$ is at least one trivalent metal oxide;
 A is at least one inorganic acid anhydride;
 I is at least one organic corrosion inhibitor;
 aq is from 0.5 to 9 moles of water; and
 x, y and z are whole or fractional numbers and
 x has a value of from 0 to 1,
 y has a value of from 0 to 0.7 and
 z has a value of from greater than 0 to 0.4,
with the proviso that the organic corrosion inhibitor is at least 0.5% by weight of inorganic material.

* * * * *